United States Patent [19]
Feldstein

[11] Patent Number: 5,304,914
[45] Date of Patent: Apr. 19, 1994

[54] PROCESS FOR CHARGING A BATTERY

[75] Inventor: Robert S. Feldstein, Pelham Manor, N.Y.

[73] Assignee: Batonex Inc., Buffalo, N.Y.

[21] Appl. No.: 826,002

[22] Filed: Jan. 27, 1992

[51] Int. Cl.$^5$ .............................................. H02J 7/04
[52] U.S. Cl. ................................................ 320/3; 320/21
[58] Field of Search ................ 320/3, 4, 5, 8, 9, 21, 320/39, 40

[56] References Cited

U.S. PATENT DOCUMENTS

| | | | |
|---|---|---|---|
| 3,614,583 | 10/1971 | Burkett | 320/5 |
| 4,385,269 | 5/1963 | Aspinwall et al. | 320/21 X |
| 4,740,739 | 4/1988 | Quammen et al. | 320/21 X |
| 4,829,225 | 5/1989 | Podrazhansky et al. | 320/21 X |

FOREIGN PATENT DOCUMENTS

| | | | |
|---|---|---|---|
| 0001061 | 12/1979 | PCT Int'l Appl. | 320/3 |
| 8101488 | 5/1981 | PCT Int'l Appl. | 320/3 |

Primary Examiner—Kristine L. Peckman
Attorney, Agent, or Firm—Howard J. Greenwald

[57] ABSTRACT

A process for charging a cell is disclosed. In this process, a discharged cell is connected to a charger. Discharge pulses are periodically withdrawn from the cell. Charging pulses are provided by the charger, and they are delivered to the cell only when the cell voltage at the end of the discharge interval is less than a specified reference voltage.

21 Claims, 2 Drawing Sheets

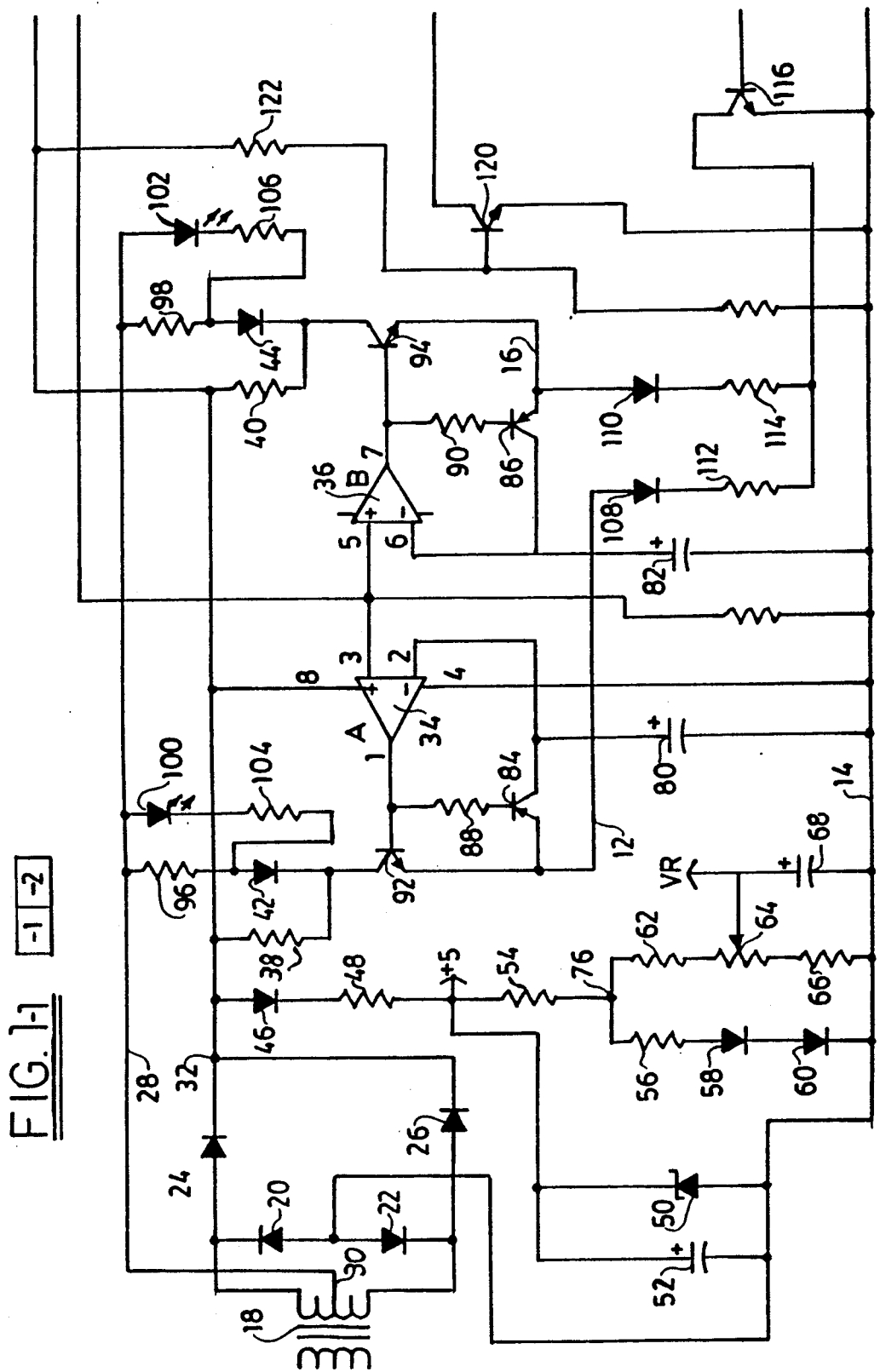

PROCESS FOR CHARGING A BATTERY

FIELD OF THE INVENTION

A battery charging process suitable for charging conventional alkaline-manganese batteries is disclosed.

BACKGROUND OF THE INVENTION

The recharging of primary batteries is frequently discouraged by battery manufacturers. Thus, for example, on page 2 of a publication entitled "Eveready Battery Engineering Data" (Union Carbide Corporation, New York, 1968), a warning is made that "IF 'EVEREADY' PRIMARY BATTERIES ARE SUBJECTED TO ANY FORM OF RECHARGING, ALL WARRANTIES ... ARE NULL AND VOID. NOTE THE DISCUSSION ON PAGE 23."

Page 23 of the Union Carbide publication discloses that, under certain limited conditions, one may recharge a primary battery. Quoting the National Bureau of Standards (letter circular LC965), the publication states that: "Although the dry cell is nominally considered a primary battery it may be recharged for a limited number of cycles under certain conditions. 1. The operating voltage on discharge should not be below 1.0 volt per cell when battery is removed from service for charging. 2. The battery should be placed on charge very soon after removal from service. 3. The ampere-hours of recharge should be 120%-180% of the discharge. 4. Charging rate should be low enough to distribute recharge over 12-16 hours. 5. Cells must be put into service soon after charging as the recharged cells have poor shelf life."

As is disclosed by this Union Carbide publication, the prior art method for recharging primary batteries is unattractive. In the first place, an operating voltage on discharge above 1.0 volt severely limits the available energy which can be withdrawn from the battery, representing only shallow discharge. In the second place, it is not always possible to place a battery on charge very soon after removal from service In the third place, end users of batteries often are unwilling to recharge a battery for a prolonged period of up to 16 hours, preferring shorter recharging cycles. In the fourth place, the recharged batteries produced by the prior process have poor shelf life.

It is an object of this invention to provide a process for recharging primary batteries which can permit an operating voltage on discharge substantially below 1.0 volt.

It is another object of this invention to provide a process for recharging primary batteries which minimizes the adverse effect of delayed recharging.

It is yet another object of this invention to provide a process which can effectively recharge a primary battery in as little as about 8 hours.

It is yet another object of this invention to provide a battery recharging process which will provide recharged primary batteries with substantially improved shelf lives.

It is yet another object of this invention to provide a battery recharging process suitable for recharging rechargeable alkaline-manganese ("RAM") batteries.

It is yet another object of this invention to provide a battery recharging process suitable for recharging rechargeable nickel-cadmium batteries.

It is yet another object of this invention to provide a battery recharging process suitable for recharging rechargeable lead-acetate batteries.

It is yet another object of this invention to provide a battery charging process suitable for recharging batteries containing lithium and thionyl chloride.

It is yet another object of this invention to provide a battery charging process suitable for recharging lithium-sulfur batteries.

SUMMARY OF THE INVENTION

In accordance with this invention, there is provided a battery charging process comprised of the steps of sequentially providing current-limited direct current pulses of short duration to a primary battery, discharging said primary battery for a short period of time, and periodically interrupting the pulsed charge-discharge sequence with a relatively long discharge cycle. The operation of the charger is controlled by comparing the voltage of the battery being charged with a reference voltage source with a specified negative-temperature coefficient and voltage at substantially the end of a discharge interval.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figures 1, 2:
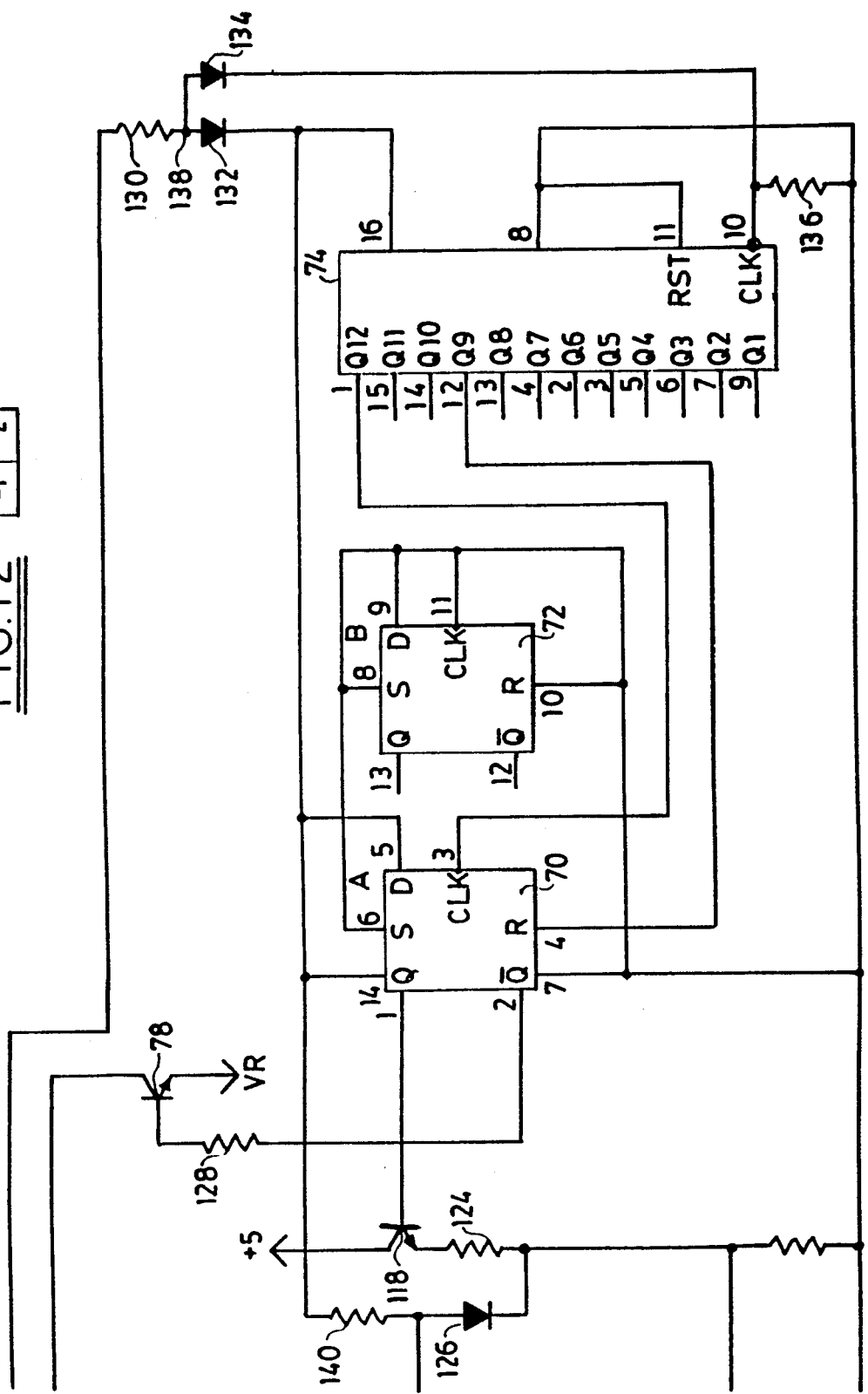
FIG. 1 is a schematic of a preferred embodiment of the battery charger of this invention.

In one illustrative preferred embodiment, the battery charger of this invention is used to charge primary zinc—manganese dioxide batteries. As is known to those skilled in the art, these primary zinc-manganese dioxide cells are usually considered to be non-rechargeable, being optimized to have their energy used and then to be discarded inasmuch as they are not protected from reaching chemically irreversible states.

These zinc-manganese dioxide primary cells are well known to those skilled in the art as "dry cells," "heavy duty dry cells," and "alkaline primary batteries;" and they are readily commercially available. Thus, by way of illustration and not limitation, and referring to Newark Electronics catalog number 110 (Newark Electronics, Chicago, Ill., 1989), one may purchase an Eveready EN91 alkaline battery (see page 562), an Eveready 101-5 zinc carbon battery (see page 562), an Eveready EV15 industrial general purpose zinc carbon battery (see page 562), an Eveready EV115 industrial heavy duty zinc carbon battery (page 562), a Duracell MN1500 alkaline battery (page 564), and the like.

By way of illustration, the dry cell may be a zinc—ammonium chloride—manganese dioxide carbon system; see, e.g., pages 34–54 of Charles Mantell's "Batteries & Energy Systems" (McGraw-Hill Inc., New York, 1983). Thus, e.g., the dry cell may be zinc-alkali--manganese dioxide primary battery (see pages 55-67 of the Mantell book), or a heavy-duty "dry cell" (see page 70 of the Mantell book), and the like.

In one preferred embodiment, the battery used in applicant's process preferably is an alkaline—manganese dioxide primary cell. By way of illustration, one such battery is disclosed in U.S. Pat. No. 4,857,424, the disclosure of which is hereby incorporated by reference into this specification. In the remainder of this section, reference will be made to the use of the process with such battery, it being understand that the process also is applicable to other zinc carbon cells.

The process of applicant's invention can recharge a battery which has been discharged to either a minor extent, or a major extent; and, furthermore, it is also capable of recharging a battery which was not placed on charge promptly following removal from service (which is often referred to as "sleepy battery" or a "battery with memory effects" when reference is made to nickel-cadmium batteries). Thus, applicant's process is substantially more versatile than the process described by the National Bureau of Standards letter circular, supra; and the charged cell produced by applicant's process has a substantially improved shelf life when compared to the shelf life of the battery produced by the prior art process.

The discharged battery is then connected to applicant's battery charger, which is described elsewhere in this specification. Thereafter, in the first step of the process, a multiplicity of charging pulses are provided to the battery.

A source of current pulses is connected to a switching means which, in turn, is connected to the battery. The switching means selectively furnishes a particular current pulse to the cell to be charged, depending upon the electrical condition of the cell at that time.

The current pulses used in applicant's process preferably are direct-current pulses with a duration of at least about 1 millisecond and, preferably, from about 1 to about 8 milliseconds, as preferably conveniently derived from conventional alternating current power sources. It is preferred that the direct current pulses have a duration of from about 5 to about 7 milliseconds and, most preferably, of about 6 milliseconds. However, as will be apparent to those skilled in the art, one may also use filtered power sources which provide substantially longer pulse options.

The current pulses will have an average value which does not exceed about 40 percent of the initial capacity of the cell and, more preferably is from about 9 to about 20 percent of the initial capacity of the cell. The initial capacity of the cell is the current rating given to such cell by the manufacturer. Thus, e.g., AA alkaline cells are rated at 1.5 ampere-hours at the 8 hour rate; and the pulses used to recharge such a cell would typically be no greater than about 200 milliamperes average.

In the process of applicant's invention, means are provided for determining whether any particular direct current pulse should be delivered through the switching means to the cell. The determining means measures the stored value of the voltage of the cell and thereafter compares it at a specified point in time in the discharge cycle (discussed below) with a reference voltage. If the stored value of voltage of the cell is below the reference voltage, the current pulse is delivered to the cell. If the stored value of voltage of the cell is above the reference voltage, the current pulse is not delivered to the cell.

The reference voltage of the cell is the final voltage desired in the charged cell; it is specified at 25 degrees Centigrade with an approximate negative temperature coefficient of from about $-0.07$ to $-0.13$ percent per degree Centigrade; in the embodiment illustrated in the Examples, the temperature coefficient is $-0.1$ percent per degree Centigrade. Thus, for a manganese dioxide primary alkaline cell, the reference voltage is at least about 1.585 volts and, preferably, is from about 1.60 to about 1.65 volts; in one embodiment, such reference voltage is 1.62 volts at 25 degrees Centigrade.

In applicant's process, in no case does the reference voltage ever exceed 1.7 volts for an alkaline manganese cell). When the process is used with a lead acid battery, the reference voltage limit is 2.45 volts per cell. When the process is used with a RAM cell, the reference voltage limit is 1.7 volts per cell. When the process is used with a nickel-cadmium cell, the reference voltage limit is 1.42 volts per cell, which in this case represents the transition voltage between current limited and constant current charging. In general, the reference voltage must not exceed the long-term, safe float voltage of the cell.

In one preferred embodiment, illustrated in FIG. 1, if the cell fails to accept and conduct a current pulse delivered to it by the switching means from the available source voltage, a small additional current path is provided to the cell supplying twice the source voltage. Without wishing to be bound to any particular theory, applicant believes that this additional current source insures initial chargeability of cells subject to prolonged discharge storage. As will be apparent to those skilled in the art, lead batteries subjected to prolonged storage after discharge often are resistant to the initiation of charging.

In applicant's process, in addition to providing periodic direct current pulses selectively to the cell to be charged, the cell is periodically discharged. Pulses of direct current are periodically withdrawn from the cell. These pulses have a duration of from about 5 to about 35 percent of the duration of direct current charging pulses; and they also have a current value during discharge of from about 10 to about 25 percent of the average current value available from the charging pulses. Thus, by way of illustration, for a system clocked by a 60 hertz power source, which will provide an average current value of about 200 milliamperes for the charging pulse within the range of about milliseconds, the discharge pulse typically will preferably have a duration of from about 1.5 to about 2.0 milliseconds and an instantaneous current value of about 40 milliamperes with a 120 hertz repetition rate.

In general, the discharge pulse represents a loss of from about 3 to about 8 percent of the available charger energy.

In addition to providing short charge pulses and withdrawing shorter discharge pulses from the cell, the process of applicant's invention periodically also terminates the charging process and provide continuous discharge of current from the cell for a relatively long period of time.

The duration of the "continuous" discharge pulse will be at least about 0.5 seconds and, more preferably, at least about 1.0 seconds. In the embodiment illustrated in the examples, the duration of this relatively long discharge pulse is about 2.0 seconds.

The current value withdrawn during the long pulse discharge is generally from about 10 to about 25 percent of the average current value available from the charging pulses. In one embodiment, illustrated in FIG. 1, the current value of the long discharge pulse is substantially identical to the current value of the short discharge pulse. In this embodiment, shared discharge components may be utilized.

It is preferred that from about 2 to about 15 percent of the total charging time be represented by periodic long discharge pulses. Thus, by way of illustration, when the long pulse discharge has a duration of about 2 seconds, the time between long pulses is about 30 seconds.

In general, when the process is used with alkaline batteries, and with nickel-cadmium cells, and with RAM cells, the time between long pulses is preferably from about 10 to about 60 seconds; with the nickel-cadmium cells and the RAM cells, comparable pulse patterns to those used with the alkaline cells may be used. By comparison, with lead-acid batteries, the duration of the long pulses is from about 15 to about 30 seconds, and the time between long pulses is from about 1.5 to about 5.0 minutes.

Without wishing to be bound to any particular theory, it has been observed that the employment of the short pulse pattern and the resulting improvement in charge acceptance beyond initial acceptance levels (typically 40 percent in alkaline cells), combined with the long pulse pattern (which permits incremental recovery of cell capacity on successive recharges) allows appropriate cell manipulation without requiring excursions beyond the safe float voltage limits of the cells and without the massive hardware required for that mode of operation.

In applicant's process, means are provided for measuring the value of, and storing the value of, the voltage of the cell at the point in time whenever discharge is terminated. At this point in time, the information regarding the cell voltage is used by a comparator to determine whether it exceeds the reference voltage. As indicated above, when cell voltage at the termination of discharge exceeds the reference voltage, no current pulse is delivered to the cell (but discharge pulses are still withdrawn from the cell on schedule regardless of the value of the cell storage voltage). Conversely, when the stored cell voltage is less than the reference voltage, the current pulse is allowed to flow to the cell.

PREFERRED EMBODIMENT OF THE CHARGER APPARATUS

FIG. 1 is a schematic diagram of one preferred embodiment of the battery charger 10 of applicant's invention. The embodiment of FIG. 1 is suitable for charging two alkaline cells independently. It will be apparent to those skilled in the art that, when battery charger 10 is to be used with other types of cells (such as lead acid cells), different time constants and current values must be provided by the circuit.

Referring to FIG. 1, one alkaline battery may be connected between point 12 and common bus 14, and another alkaline battery may be connected between point 16 and common bus 14. It will be apparent to those skilled in the art that one may design a similar circuit adapted to charge 4, 8, 20, or any arbitrary and desired number of cells.

Referring again to FIG. 1, alternating current preferably is provided through mains transformer 18 to diodes 20, 22, 24, and 26. In one embodiment, the alternating current is standard 120 volt/60 hertz mains power. In another embodiment, the alternating current is conventional 220 volt/50 hertz mains power. Other alternating current sources also may be used.

The alternating current provided to diodes 20 and 22 is rectified. The direct current thus produced is connected to common bus 14. The main positive bus 28 is taken from the center tap 30 of the secondary of transformer 18.

Diodes 24 and 26 provide a rectified positive voltage to bus 32, which is about twice as great as that voltage on bus 28. The positive voltage on bus 32 may be used to power comparators 34 and 36 and to provide the source for the resistance cell breakdown voltage provided through resistors 38 and 40.

As indicated in the specification, if a cell connected between bus 14 and either point 12 or 16 fails to conduct, then resistors 38 and/or 40 will provide voltage from bus 32 to the nonconductive cell by reversing isolating diodes 42 or 44. This increased voltage generally is sufficient to initiate charge acceptance within the cell.

Means for comparing the voltage of either cell with a reference voltage derived from the network comprised of elements 46 through 68 is also provided by the circuit. In the embodiment illustrated in FIG. 1, such a means is provided by a current from bus 32 which passes through isolation diode 46 (which functions as a reverse discharge isolator), and current limiting resistor 48 to zener diode 50; this current is filtered by capacitor 52. Zener diode 50 typically has an approximately 5 volt breakdown voltage to provide appropriate supply voltage for the digital integrated circuits 70, 72, and 74 and a well-regulated, zero-temperature coefficient source for the second stage regulator, consisting of elements 54 through 68. Current from the voltage provided by elements 50 and 52 flows from resistors 54 and 56 in series, and through diodes 58 and 60 in series with them. Diodes 58 and 60 provide a secondary regulator to help insure minimal line voltage perturbation, and they provide a large negative temperature coefficient. Thus, by choosing the relationship between resistors 54 and 56, a desired temperature coefficient may be selected.

The junction 76 of resistors 54 and 56 is the source of current for resistors 62, 64, and 66 in series, with variable resistor 64 acting as the voltage reference adjustment. Capacitor 68 acts as a secondary filter for the reference voltage.

The reference voltage is delivered to comparators 34 and 36 through transistor switch 78 under the control of the timing circuits to be described later.

The cell voltage at points 12 and 16 is tracked by transistor switches 84 and 86, respectively, and stored on capacitors 80 and 82, which are connected to the inverting inputs of comparators 34 and 36. In the embodiment illustrated, transistors 84 and 86 are controlled by the outputs of comparators 34 and 36 through resistors 88 and 90 and, thus, are automatically turned on when main battery pulse charging transistor switches 92 and 94 are deactivated.

Primary charging current pulses to the batteries are provided through current limiting resistors 96 and 98, which are shunted by light-emitting diodes 100 and 102, which are in turn current-limited by protective resistors 104 and 106; and they act as charging activity displays.

Discharge pulses from cells connected at points 12 and 16 flow through isolation diodes 108 and 110, and discharge current control resistors 112 and 114, when transistor switch 116 is on. Transistor switch 116 is on when either transistor 118 turns it on through resistor 124, or transistor 120 permits current to flow through resistor 140 and diode 126. Transistor 120 will prevent current through resistor 140 from reaching transistor 116 by shunting it to common bus 14 whenever bus 32 is sufficiently positive to power transistor 120 through resistor 122. In other words, transistor 120 acts as a zero crossing enable switch for transistor 116 to provide the brief discharge pulses through resistors 112 and 114.

The two-second discharge pulse is provided by powering transistor 116 through resistor 124 from transistor 118 when flip-flop 70 is turned on (binary 1). At that time, flip-flop 70 also disconnects voltage reference switch 78 from the non-inverting inputs to comparators 34 and 36.

The additional flip-flop 72 is unused, and its inputs are appropriately connected to common negative bus 14 to prevent noise response in this unused half of the integrated circuit containing flip-flop 70.

Flip-flop 70 is, in turn, controlled by twelve-bit binary counter 74, which turns it on when output Q12 of counter 74 transits positive and turns it off when output Q9 of counter 74 becomes positive. Thus, flip-flop 70 is on only from the positive edge onset of Q12 to the next positive output of Q9 (which is about fifteen percent of the time).

Counter Q12, in turn, counts 120 pulses per second (in the case of a 60 hertz source) derived from bus 32 through resistor 130, diode 134, and resistor 136 connected to its clock input. Junction 138 between resistor 130 and diode 134 is clamped to the plus-five volt power supply line through clamp diode 132 in order to prevent excessive voltage from being applied to the clock input of counter 74.

By way of illustration and not limitation, certain conventional and widely available components are suggested below for use in device 10. However, it will be readily apparent to those skilled in the art that other, comparable, commercially available components may be substituted for those described with no substantial adverse effect.

It is preferred that all of the resistors in device 10 be commercially available carbon-film resistors, with the exception of resistors 96 and 98 (which are 2.0 watt resistors, such a wire-wound, metal-film, or carbon-film 2.0 watt resistors).

It is preferred that each of the diodes in device 10 be a 1N4001 diode, or be comparable thereto. The zener diode 50 should preferably be 1N4731A zener diode, or be comparable thereto. Light-emitting diodes 100 and 102 are preferably selected on the basis of their appearance.

PNP transistors 84 and 86 are preferably 2N4403 transistors, or any transistor even remotely similar thereto. NPN transistors 92, 94, 116, 118, 120, and 78 are preferably 2N4401 transistors, or any comparable transistor.

Comparators 34 and 36 may be halves of a LM358 integrated circuit, or may be virtually any dual operational amplifier such as, e.g., 1458. Alternatively, comparators 34 and 36, when used in larger system with additional comparators, could be part of a LN324 quad operational amplifier (or of a similar device).

Flip-flops 70 and 72 are marked to correspond with the pin layout of CMOS part 4013. Binary counter 74 is shown as a CMOS part 4040.

Filter capacitors 52 and 68 are typical small electrolytic capacitors. Information storage capacitors 80 and 82 are preferably solid electrolyte tantalum units.

For a system designed for no more than four AA-size cells to be simultaneously charged, transformer 18 should preferably be a half-by-half core medium quality (M19) step-down transformer with a secondary voltage of 10.8 volts center tap open circuit.

For a system requiring larger capacity (either more cells or larger cells), a larger transformer core will be required to provide the needed power. Voltage need not be increased unless groups of cells are to be charged in series.

RECHARGING RECHARGEABLE ALKALINE MANGANESE (RAM) CELLS

As is known to those skilled in the art, Rechargeable Alkaline Manganese cells are currently available (as "RAM" cells) from the Battery Technology Inc. corporation of Mississauga, Ontario, Canada. These cells are specifically intended for recharging, and the significantly improved cycle life has been provided by modifying certain characteristics of primary alkaline cells.

Low temperature operation, peak charge and discharge current, and total capacity of these cells are somewhat reduced from their primary cell counterparts.

In the process of this invention, when used with RAM cells, no significant change in charger 10 is required. However, the reference voltage used for these cells is recommended to be 1.65 volts direct current at 25 degrees Centigrade with a negative temperature coefficient of about 0.1 percent per degree Centigrade.

RECHARGING LEAD ACID BATTERIES WITH APPLICANT'S PROCESS

Lead acid batteries are well known to those skilled in the art and are described, e.g., on pages 142–187 of the Mantell book. These batteries are available as single cells, but they generally are provided as multi-cell preassembled batteries. While accessible liquid electrolyte batteries are still widely available, sealed lead acid (SLA) batteries have become an ever-increasing portion of the market, both as flooded cells (typical of automotive applications) and starved (recombinant) or gel cells, typical of industrial applications. Thus, in applicant's process, a typical battery charger appropriate for these applications would be designed for a multi-cell series configuration, with 6 and 12 volt nominal (i.e., 3- and 6-cell groups) being the most common. An appropriate set of constants by the same architecture shown in FIG. 1 would be a reference voltage 2.3 volts per cell, an average available charging current of from about 1 to about 50 percent of the nominal ampere-hour capacity, a charge withdrawal ratio comparable to that used with the alkaline cells, and time constants very much longer (as discussed elsewhere in this specification).

CHARGING NICKEL-CADMIUM OR NICKEL-HYDRIDE BATTERIES

Nickel-cadmium or nickel hydride batteries differ fundamentally in their charge requirements from all of the batteries previously discussed. They are designed for constant current recombinant standby service. While many schemes are available to enhance rechargeability, generally referred to as delta-T or delta-V systems, these approaches are generally a bit tricky and require battery and charger to be an integrated design. In applicant's system, a modification of the device 10 which provides constant current in place of the no-charge portion of the cycle (when the comparator indicates that the voltage exceeds the reference voltage) will work very effectively if the reference voltage is set to about 1.42 volts per cell and 25 degrees Centigrade with a negative temperature coefficient of 0.1 percent per degree Centigrade. Charging current can be as high as twice the nominal ampere capacity of the cell for completely conventional cells, without requiring high-temperature of fast-charging special construction cells. When the sampled voltage exceeds the reference voltage, a current of about 10 percent of the ampere hour capacity is generally appropriate.

The following examples are presented to illustrate the claimed invention but are not to be deemed limitative thereof.

EXAMPLE 1

The charger circuit of FIG. 1 was used to recharge a pair of AA Duracell alkaline batteries 1.5 volt batteries. These batteries were discharged using a 10-ohm load until 1.4 ampere-hours had been withdrawn from each of them. Thereafter, using the circuit of FIG. 1, they were charged independently with a maximum current of 200 milliamperes, a discharge current of 40 milliamperes, a discharge duration of 2 milliseconds out of each 8.33 millisecond interval, and a long pulse discharge of 2.0 seconds per every 30 seconds.

The batteries were recharged for 18 hours and then allowed to stand for 48 hours. Thereafter, they were discharged in series with a 10-ohm load a second time to a total of 1.0 ampere-hour removed capacity and a final voltage of 0.9 volts per cell. Then the batteries were recharged for 16 hours (using a voltage reference of 1.582 volts), and then they were discharged under the above conditions.

In the third cycle, 1.3 ampere hours were removed to a final combined voltage of 1.9 volts. The batteries were recharged using the conditions used in cycle two, and they then were discharged again, providing 1.1 ampere hours, to a final voltage of 1.8 volts. Recharge was repeated, but the reference voltage was moved to 1.585 volts.

In discharge number 5, the conditions described were used, but only 950 milliamperes hours were provided to a cutoff of 1.8 volts. Recharge was again conducted using a reference voltage of 1.585 volts. Discharge occurred as described above, but only 925 milliamperes hours were provided to a cutoff of 1.80 volts.

At this point, it was apparent that the reference voltage was too low. Thus, the reference voltage was raised to 1.60 volts, and the cells were parked for 90 hours on charge to reach equilibrium. The next discharge (cycle seven) yielded 1.18 ampere hours, and recharge was repeated at 1.615 reference volts for 20 hours.

The next discharge yielded only 925 milliamperes hours, to a cutoff voltage of 1.80 volts; and the reference voltage was raised to 1.63 volts for 20 hours recharge.

In cycle 9, only 900 milliamperes hours were produced. The cells were returned to recharge at 1.630 volts for 72 hours.

It should be noted that, despite the fact that the capacity of these cells clearly declined, this is a singularly brutal test, since essentially all of the available capacity is being withdrawn each cycle, and the rechargeable capacity of a primary cell is only about 67 percent of its primary capacity. The early apparent excess capacity was probably provided by additional irreversible primary discharge. If the expected capacity of a 1.5 ampere-hour cell is nominally 1.0 ampere hour as a rechargeable, and one is still able to extract 90 percent of that capacity on the ninth recharge—discharge cycle, clearly something effective is happening.

EXAMPLE 2

A single, AA 1.5 ampere-hour alkaline battery, sold under the name of "Duracell" by Mallory Corporation, was subjected to a complex and varying test sequence.

Initial discharge was conducted with a ten-ohm resistor and only 675 milliamperes hours (about one-half of nominal capacity) were withdrawn with an end-terminal voltage of 1.25 volts. The battery was recharged for 20 hours at 1.582 volts direct current with a current limit of 150 milliamperes.

In the second discharge cycle, using the conditions described above, 600 milliamperes hours were withdrawn to an end voltage of 1.212 volts, and recharge was repeated as described above.

In the third cycle, using the conditions described above, 600 milliamperes hours were again withdrawn to an end voltage of 1.223 volts, and recharge was repeated as described above.

The fourth cycle was identical to the third, but the end voltage 1.189. The fifth cycle was substantially identical to the fourth, but the end voltage was 1.219 volts; and, in this cycle, recharge was continued for 72 hours.

It had become clear that shallow discharge and cautious recharge were not providing a significant aging rate. Thus, conditions were changed drastically.

In cycle six, the discharge produced 600 milliamperes hours to an end voltage of 1.294 volts, and the load was allowed to remain connected for an additional 20 hours to a deep discharge end voltage of 0.078 volts direct current. The cell was then recharged for 24 hours using the conditions described above.

The seventh discharge cycle produced only 650 milliamperes hours to an end voltage of 0.90 volts. The observed capacity of the cell had been reduced to less than half of its nominal value.

The cell was then recharged, as described above. Then it was connected to the charging device shown in FIG. 1 and utilized in Example 1; and it was allowed to charge for an additional 24 hours.

Discharge cycle eight was then run with a 5.0 ohm load (a more severe discharge, but equal in severity to the discharge conditions used in Example 1). Discharge cycle eight yielded 1.0 ampere-hours to an end point of 0.9 volts. Substantially most of the battery capacity had been reclaimed with a single pulsed discharge period.

Following discharge number eight, the battery was returned to straight direct current charging, substantially as described above, with the exception that the charging voltage used was 1.60 volts. The battery was charged for 72 hours.

In discharge cycle 9, the procedure of discharge cycle 8 were substantially repeated; and 1.1 ampere hours were delivered to an end voltage of 0.918 volts. The recharge voltage was raised to 1.615 volts, and recharging occurred for 36 hours.

In discharge cycle number 10, only 900 milliamperes hours were provided, to a 0.9 volts cutoff. Recharge was at 1.630 volts, for 20 hours.

In discharge cycle 11, the conditions of cycles 8, 9, and 10 were used for discharge. Only 650 milliamperes hours were available to a cutoff of 0.9 volts.

It appears from this data that direct current recharging does not conserve cell capacity in the face of cyclic deep discharge.

EXAMPLE 3

In this Example, two elderly RAM (rechartable alkaline manganese) cells were tested. These cells were initially obtained from the Battery Technology Inc. company of Mississauga, Ontario, Canada. They were aged using different regimens. One of the cells was heavily discharged and then stored for 30 days. The other cell was stored in a charged condition for 30 days.

Initially, each of these cells was charged using 1.65 volts direct current pulses for 48 hours; the pulses were on for about six milliseconds, and off for about 2 milliseconds.

The initial capacity of these cells, under a 10-ohm load, was 650 milliampere hours for the discharged storage cell (the "sleepy cell"), and it was 870 milliampere hours for the normal RAM cell.

Each of these cells were simultaneously recharged for 20 hours in the apparatus of FIG. 1, using the conditions described in Example 1, with the exception that the reference voltage used was 1.65 volts.

In a second cycle, the cells were discharged as described above; they were taken down to 840 and 870 milliampere hours for the sleepy cell and the normal cell, respectively, to end voltages of 1.10 and 1.15 volts, respectively. These cells were then recharged to 20 hours in accordance with the pulse procedure described above.

The cells were discharged as described above, and they provided only 600 and 650 milliampere hours to cutoff voltages of 0.929 and 1.005 volts, respectively. It was believed that a prolonged power outage occurred during this recharging cycle.

Recharge was repeated for 72 hours, in accordance with the pulse procedure described above. The cells were then totally discharged for 24 hours with 10-ohm resistors to well below 0.1 volts per cell.

The cells were then recharged for 48 hours using the charger of FIG. 1. The next discharge was run with 5-ohm resistors, providing a severe test. The sleepy cell provided 1.1 ampere hours to a cutoff voltage of 0.94 volts; the normal cell provided only 0.9 ampere hours to a cutoff voltage of 0.83 volts.

It appears that the normal cell, which had a long cyclic history, was finally suffering irreversible capacity decline. The sleepy cell, which had fewer cycles in its history, recovered quite well under in the dual pulse environment.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A process for charging a zinc-manganese dioxide primary cell, comprising the steps of:
   (a) connecting a discharged zinc-manganese dioxide primary cell to a battery charger, wherein said battery charger is comprised of means for comparing the voltage of said cell at the termination of a discharge interval with a specified reference voltage, means for periodically discharging said cell, and means for periodically producing direct current charging pulses with a duration of at least 1 millisecond and an average value which does not exceed 40 percent of the initial capacity of the cell;
   (b) periodically withdrawing discharging pulses of direct current from said cell during a discharge interval, wherein:
      1. said discharging pulses of direct current have a duration of from 5 to 35 percent of the duration of said direct current charging pulses, and
      2. said discharging pulses of direct current have a current value during discharge of from 10 to 25 percent of the average current value of said direct current charging pulses;
   (c) delivering said direct current charging pulses to said cell whenever said voltage of said cell at the end of said discharge interval is less than said specified reference voltage; and
   (d) preventing the delivery of said direct current charging pulses to said cell whenever said voltage of said cell at the end of said discharge interval is greater than said specified reference voltage.

2. A process for charging a zinc-manganese dioxide primary cell, comprising the steps of:
   (a) connecting a discharged zinc-manganese dioxide primary cell to a battery charger, wherein said battery charger is comprised of means for comparing the voltage of said cell at the termination of a discharge interval with a specified reference voltage, means for periodically discharging said cell, and means for periodically producing direct current charging pulses with a duration of at least 1 millisecond and an average value which does not exceed 40 percent of the initial capacity of the cell;
   (b) periodically withdrawing discharging pulses of direct current from said cell during a discharge interval, wherein:
      1. said discharging pulses have a duration of at least 0.5, and
      2. said discharging pulses of direct current have a current value during discharge of from 10 to 25 percent of the average current value of said direct current charging pulses;
   (c) delivering said direct current charging pulses to said cell whenever said voltage of said cell at the end of said discharge interval is less than said specified reference voltage; and
   (d) preventing the delivery of said direct current charging pulses to said cell whenever said voltage of said cell at the end of said discharge interval is greater than said specified reference voltage.

3. A process for charging a zinc-manganese dioxide primary cell, comprising the steps of:
   (a) connecting a discharged zinc-manganese dioxide primary cell to a battery charger, wherein said battery charger is comprised of means for comparing the voltage of said cell at the termination of a discharge interval with a specified reference voltage, means for periodically producing direct current charging pulses with a duration of at least 1 millisecond and an average value which does not exceed 40 percent of the initial capacity of the cell;
   (b) periodically withdrawing first discharging pulses of direct current from said cell during a first discharge interval, wherein:
      2. said first discharging pulses of direct current have a duration of from 5 to 35 percent of the duration of said direct current charging pulses, and
      2. said first discharging pulses of direct current have a current value during discharge of from 10 to 25 percent of the average current value of said direct current charging pulses;

(c) periodically withdrawing second discharging pulses from said cell during a second discharge interval, wherein:
1. said second discharging pulses have a duration of at least 0.5 seconds, and
2. said second discharging pulses of direct current have a current value during discharge of from 10 to 25 percent of the average current value of said direct current charging pulses;

(d) delivering said direct current charging pulses to said cell whenever said voltage of said cell at the end of said first discharge interval is less than said specified reference voltage;

(e) preventing the delivery of said direct current charging pulses to said cell whenever said voltage of said cell at the end of said first discharge interval is greater than said specified reference voltage;

(f) delivering said direct current charging pulses to said cell whenever said voltage of said cell at the end of said second discharge interval is less than said specified reference voltage; and (g) preventing the delivery of said direct current charging pulses to said cell whenever said voltage of said cell at the end of said second discharge interval is greater than said specified reference voltage.

4. The process as recited in claim 1, wherein said zinc-manganese primary cell is an alkaline cell.

5. The process as recited in claim 4, wherein said specified reference voltage does not exceed 1.7 volts.

6. The process as recited in claim 2, wherein said zinc-manganese primary cell is an alkaline cell.

7. The process as recited in claim 6, wherein said specified reference voltage does not exceed 1.7 volts.

8. The process as recited in claim 3, wherein said zinc-manganese primary cell is an alkaline cell.

9. The process as recited in claim 8, wherein said specified reference voltage does not exceed 1.7 volts.

10. A process for charging a cell, comprising the steps of:

(a) connecting (a) discharged cell to a battery charger, wherein said battery charger is comprised of means for comparing the voltage of said cell at the termination of a discharge interval with a specified reference voltage means for periodically discharging said cell, and means for periodically producing direct current charging pulses with a duration of at least 1 millisecond and an average value which does not exceed 40 percent of the initial capacity of the cell;

(b) periodically withdrawing discharging pulses of direct current from said cell during a discharge interval, wherein:
1. said discharging pulses of direct current have a duration of from 5 to 35 percent of the duration of said direct current charging pulses, and
2. said discharging pulses of direct current have a current value during discharge of from 10 to 25 percent of the average current value of said direct current charging pulses;

(c) delivering said direct current charging pulses to said cell whenever said voltage of said cell at the end of said discharge interval is less than said specified reference voltage; and (d) preventing the delivery of said direct current charging pulses to said cell whenever said voltage of said cell at the end of said discharge interval is greater than said specified reference voltage.

11. A process for charging a cell, comprising the steps of:

(a) connecting said discharged cell to a battery charger, wherein said battery charger is comprised of means for comparing the voltage of said cell at the termination of a discharge interval with a specified reference voltage, means for periodically discharging said cell, and means for periodically producing direct current charging pulses with a duration of at least 1 millisecond and an average value which does not exceed 40 percent of the initial capacity of the cell;

(b) periodically withdrawing discharging pulses of direct current from said cell during a discharge interval, wherein:
1. said discharging pulses have a duration of at least 0.5 seconds, and
2. said discharging pulses of direct current have a current value during discharge of from 10 to 25 percent of the average current value of said direct current charging pulses;

(c) delivering said direct current charging pulses to said cell whenever said voltage of said cell at the end of said discharge interval is less than said specified reference voltage;

(d) preventing the delivery of said direct current charging pulses to said cell whenever said voltage of said cell at the end of said discharge interval is greater than said specified reference voltage.

12. A process for charging a cell, comprising the steps of:

(a) connecting discharged cell to a battery charger, wherein said battery charger is comprised of means for comparing the voltage of said cell at the termination of a discharge interval with a specified reference voltage, means for periodically discharging said cell, and means for periodically producing direct current charging pulses with a duration of at least 1 millisecond and an average value which does not exceed 40 percent of the initial capacity of the cell;

(b) periodically withdrawing first discharging pulses of direct current from said cell during a first discharge interval wherein:
1. said first discharging pulses of direct current have a duration of from 5 to 35 percent of the duration of said direct current charging pulses, and
2. said first discharging pulses of direct current have a current value during discharge for from 10 to 25 percent of the average current value of said direct current charging pulses;

(c) periodically withdrawing second discharging pulses from said cell during a second discharge interval, wherein:
1. said second discharging pulses have a duration of at lease 0.5 seconds, and
2. said second discharging pulses of direct current have a current value during discharge of from 10 to 25 percent of the average current value of said direct current charging pulses;

(d) delivering said direct current charging pulses to said cell whenever said voltage of said cell at the end of said first discharge interval is less than said specified reference voltage;

(e) preventing the delivery of said direct current charging pulses to said cell whenever said voltage of said cell at the end of said first discharge interval is greater than said specified reference voltage;

(f) delivering said direct current charging pulses to said cell whenever said voltage of said cell at the end of said second discharge interval is less than said specified reference voltage; and (g) preventing the delivery of said direct current charging pulses at said cell whenever said voltage of said cell at the end of said second discharge interval is greater than said specified reference voltage.

13. The process as recited in claim 10, wherein said cell is a rechargeable alkaline manganese cell.

14. The process as recited in claim 11, wherein said cell is a rechargeable alkaline manganese cell.

15. The process as recited in claim 12, wherein said cell is a rechargable alkaline manganese cell.

16. The process as recited in claim 10, wherein said cell is a rechargeable lead acid cell.

17. The process as recited in claim 11, wherein said cell is a rechargeable lead acid cell.

18. The process as recited in claim 12, wherein said cell is a rechargable lead acid cell.

19. A process for charging a nickel-cadmium cell, comprising the steps of:

(a) connecting a discharged nickel-cadmium cell to a battery charger, wherein said battery charger is comprised of means for comparing the voltage of said cell at the termination of a discharge interval with a specified reference voltage, means for periodically discharging said cell, and means for periodically producing direct high current charging pulses with a duration of at least 1 millisecond and an average value which does not exceed twice the initial capacity of the cell;

(b) periodically withdrawing discharging pulses of direct current from said cell during a discharge interval, wherein:
 1. said discharging pulses of direct current have a duration of duration of from 5 to 35 percent of the duration of said direct current charging pulses, and
 2. said discharging pulse of direct current have a current value during discharge of from 5 to 15 percent of the average current value of said direct current charging pulses;

(c) delivering said direct current charging pulses to said cell whenever said voltage of said cell at the end of said discharge interval is less than said specified reference voltage; and (d) substituting lower current pulses of from 5 to 10 percent of current capacity of said cell for said high current pulses and delivering said lower current pulses to said cell whenever said voltage of said cell at the end of said discharge interval is greater than said specified reference voltage.

20. A process for charging a nickel-cadmium cell, comprising the steps of:

(a) connecting a discharged nickel-cadmium cell to a battery charger, wherein said battery charger is comprised of means for comparing the voltage of said cell at the termination of a discharge interval with a specified reference voltage, means for periodically discharging said cell, and means for periodically producing direct high current charging pulses with a duration of at least 1 millisecond and an average value which does not exceed twice the initial capacity of the cell;

(b) periodically withdrawing discharging pulses of direct current from said cell during a discharge interval, wherein:
 1. said discharging pulses have a duration of at least 0.5 seconds, and
 2. said discharging pulses of direct current have a current value during discharge of from 5 to 15 percent of the average current value of said direct current charging pulses;

(c) delivering said direct current charging pulses to said cell whenever said voltage of said cell at the end of said discharge interval is less than said specified reference voltage; and (d) substituting lower current pulses of from 5 to 10 percent of current capacity of said cell for said high current pulses and delivering said lower current pulses to said cell whenever said voltage of said cell at the end of said discharge interval is greater than said specified reference voltage.

21. A process for charging a nickel-cadmium cell, comprising the steps of:

(a) connecting a discharged nickel-cadmium cell to a battery charger, wherein said battery charger is comprised of means for comparing the voltage of said cell at the termination of a discharge interval with a specified reference voltage, means for periodically discharging said cell, and means for periodically producing direct high current charging pulses with a duration of at least 1 millisecond and an average value which does not exceed twice the initial capacity of the cell;

(b) periodically withdrawing first discharging pulses of direct current from said cell during a first discharge interval, wherein:
 1. said first discharging pulses of direct current have a duration for from 5 to 35 percent of the duration of said direct current charging pulses, and
 2. said first discharging pulses of direct current have a current value during discharge of from 5 to 5 percent of the average current value of said direct current charging pulses;

(c) periodically withdrawing second discharging pulses from said cell during a second discharge interval wherein:
 1. said second discharging pulses have a duration of at least 0.5 seconds, and
 2. said second discharging pulses of direct current have a current value during discharge of from 5 to 15 percent of the average current value of said direct current charging pulses;

(d) substituting lower current pulses of from 5 to 10 percent of current capacity of said cell for said high current pulses and delivering said lower current pulses to said cell whenever said voltage of said cell at the end of said first discharge interval is greater than said specified reference voltage; and (e) substituting said lower current pulses of from 5 to 10 percent of current capacity of said cell for said high current pulses and delivering said lower current pulses to said cell whenever said voltage of said cell at the end of said second discharge interval is greater than said specified reference voltage.

* * * * *